(12) United States Patent
Hiroki

(10) Patent No.: US 6,535,207 B1
(45) Date of Patent: Mar. 18, 2003

(54) DISPLAY DEVICE AND DISPLAY DEVICE CORRECTION SYSTEM

(75) Inventor: Masaaki Hiroki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/289,983

(22) Filed: Apr. 13, 1999

(30) Foreign Application Priority Data

Apr. 16, 1998 (JP) ............................................ 10-122988

(51) Int. Cl.[7] ................................................. G09G 5/00
(52) U.S. Cl. ......................... 345/207; 348/180; 348/181
(58) Field of Search ........................ 345/89, 204, 147, 345/150, 207, 87, 589, 690; 348/180, 181, 744, 189, 745

(56) References Cited

U.S. PATENT DOCUMENTS

| | | | | |
|---|---|---|---|---|
| 5,325,195 A | * | 6/1994 | Ellis et al. .................. 348/189 |
| 5,369,432 A | * | 11/1994 | Kennedy .................... 348/181 |
| 5,386,253 A | * | 1/1995 | Fielding .................... 348/745 |
| 5,650,844 A | * | 7/1997 | Aoki et al. ................. 356/237 |
| 5,803,570 A | * | 9/1998 | Chen et al. ................ 348/745 |
| 6,285,349 B1 | * | 9/2001 | Smith ........................ 345/204 |

\* cited by examiner

Primary Examiner—Kent Chang
(74) Attorney, Agent, or Firm—Eric J. Robinson; Robinson Intellectual Property Law Office, P.C.

(57) ABSTRACT

To maintain for hours a display with high image quality and fine quality in a projector and a display system including the same. Using correction data obtained in accordance with the need of a user, correction processing is performed on an inputted video signal to input the corrected signal into a liquid crystal panel, thereby keeping good display characteristics.

29 Claims, 3 Drawing Sheets

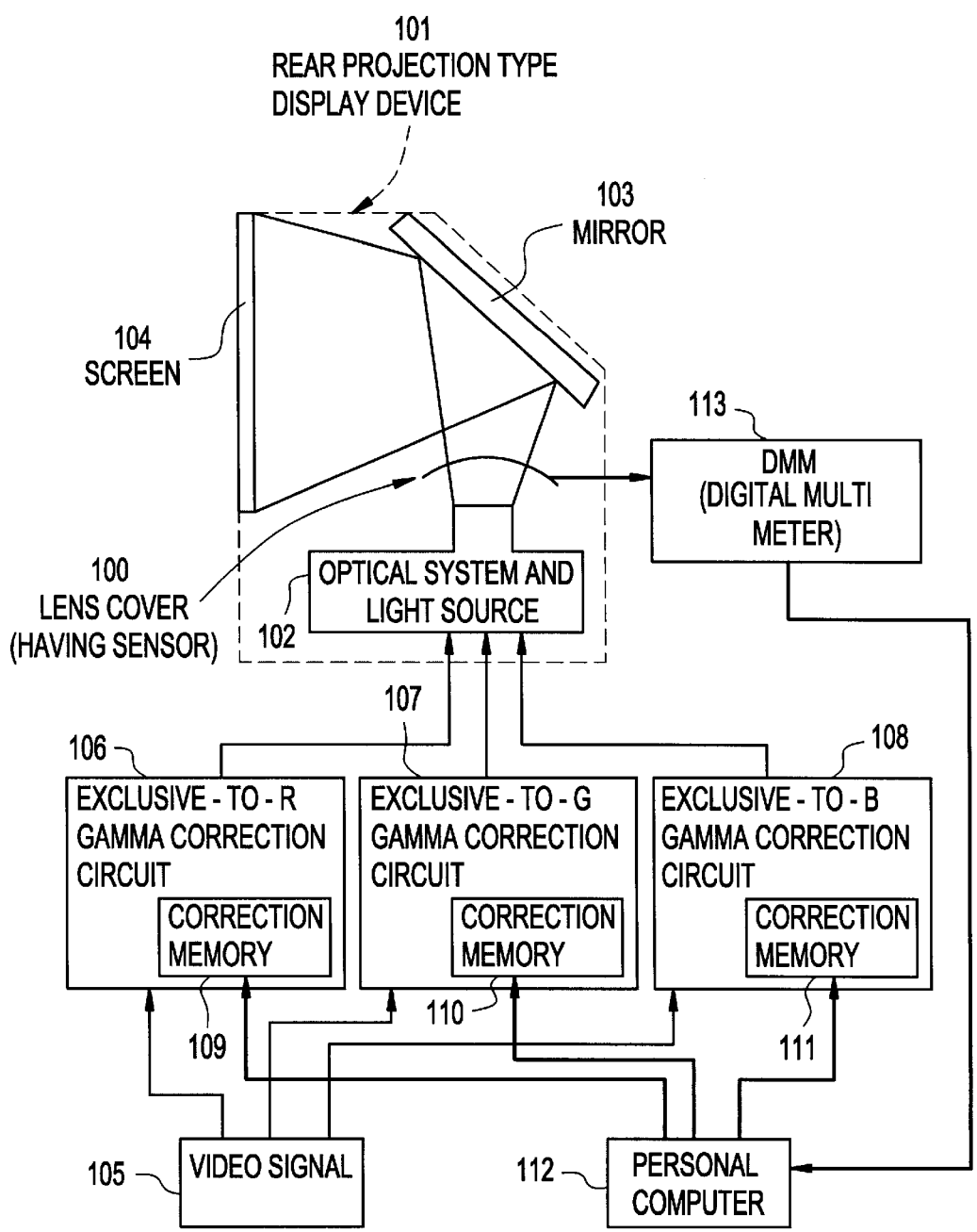

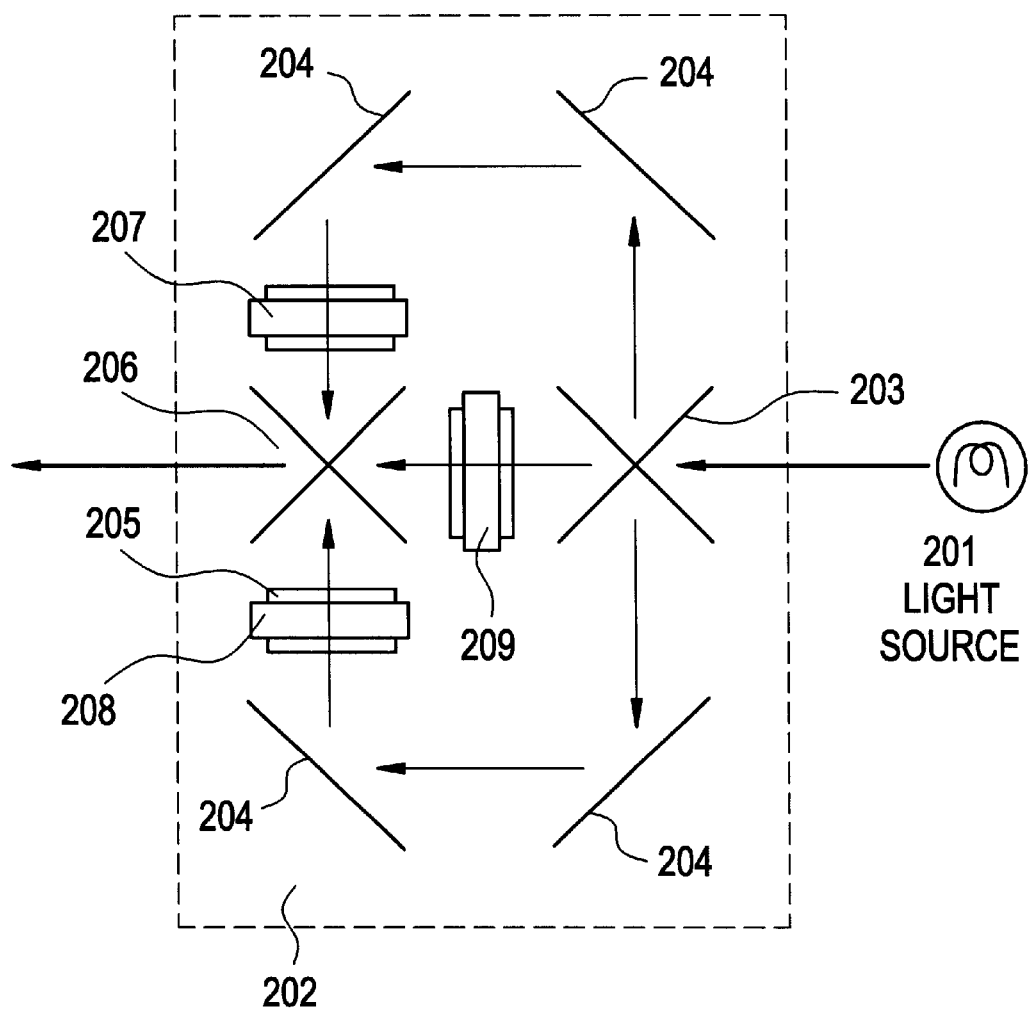

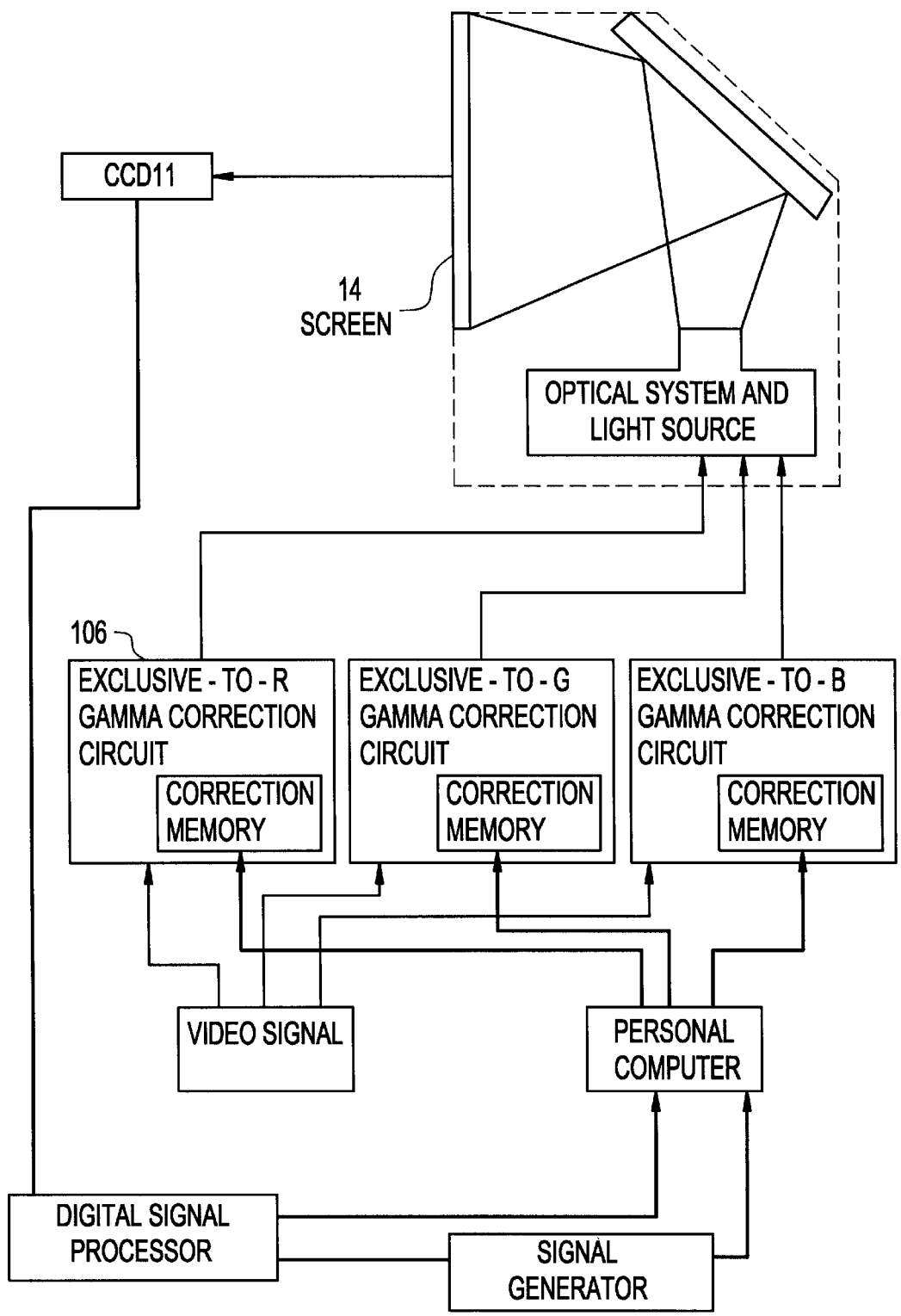

DISPLAY DEVICE AND DISPLAY DEVICE CORRECTION SYSTEM

BACKGROUND OF THE INVENTION

1. Field of the Invention

The present invention relates to a display device that can be modulated in its optical characteristics by voltage, current, frequency and other electric factors, and to a display device correction system. More particularly, the present invention relates to a projection type display device in which an element such as a thin film transistor (TFT) is provided for every display pixel.

2. Description of the Related Art

Recently, a technique has been rapidly developed which relates to fabrication of a semiconductor device, such as a thin film transistor (TFT), having a semiconductor thin film formed on an insulating substrate. This is caused by an increasing demand for a liquid crystal display device of active matrix type (liquid crystal panel).

A liquid crystal display device of active matrix type (liquid crystal panel) has an great advantage, over CRT, that it can provide a larger screen (of size 40 to 100) at lower cost and can also provide an image with higher resolution to an observer.

Projectors using such a liquid crystal panel (front projectors, rear projectors, etc.) have been increasingly developed in recent years. In a front projector, light from a light source is irradiated onto a liquid crystal panel to form an image on a reflection type screen, whereby the reflected light from the screen is provided as an image to a user. In a rear projector, on the other hand, light from a light source is irradiated onto a liquid crystal panel to form an image on the surface of a transmission type diffuser screen (hereinafter, may simply be referred to as a "screen"), thereby allowing an image to be observed from the screen face side that is opposed to the light source.

Such projectors include a transmission type single-panel model using a single panel capable of multicolor display of RGB, and a triple-panel model in which three kinds of monochrome display panels each corresponding to the color R, G and B are used to optically synthesize those three kinds of monochrome screens.

The display panels both for the single-panel model and the triple-panel model have basically the same structure except that the monochrome display panel is comprised of pixels all of which are devoted to the only one of the primary RGB colors consisting of three colors of R, G and B, while the multicolor display panel is comprised of pixels to which the respective primary RGB colors are allocated.

In the transmission type display panel for use in projectors etc., which utilizes as an electro-optic substance the liquid crystal (or the like), the relationship between optical modulation rate thereof and voltage level of video signals is nonlinear. Further, nonlinearity is different in the primary color of R, G and B in dependence upon dispersion characteristic or the like of the liquid crystal. In order to pre-correct this nonlinearity, a gamma correction circuit is incorporated in an IC chip or a peripheral driver circuit.

In a conventional projector, as shown in FIG. 3, at the time of shipment, in which an image displayed on a screen 14 is measured from the front by a measurement device such as a CCD 11, and a part of the resultant image data is stored in a memory to write gamma correction data based on that stored data into a gamma correction memory. This writing operation into the gamma correction memory is performed only once at the time of shipment of the device. In other words, conventionally, gamma correction data written into the memory at the time of shipment is not rewritten thereafter.

In the conventional projectors, keeping good display performance has been impossible because of change of the image quality caused by degradation in a light source, a liquid crystal panel and a polarizer which would be arisen from use over hours. Such degradation has been a serious problem in that degradation in the liquid crystal panel and the polarizer which would be mainly brings about lowering of the contrast ratio and degradation in the light source mainly incurs a deterioration in the display characteristics (reproducibility of color, brightness).

Also, demanded performance level of projectors is getting higher day by day, which promotes enhancement, increasing display pixels in number, of liquid crystal panels in terms of fineness and density.

Thus, the problem to be addressed in a projector and a system including the same is designed to maintain the display of high image quality and fine quality for hours.

SUMMARY OF THE INVENTION

The present invention has been made in view of the above, and an object of the present invention is to provide a display device and a display device correction system, which are capable of keeping for hours an excellent display characteristics.

To attain this, disclosed herein in accordance with an aspect of the present invention is:

a display device comprising a liquid crystal panel, a liquid crystal panel driver circuit and a memory, for displaying video light obtained by irradiating with light the liquid crystal panel to which a video signal is inputted, characterized in that:

the display device comprising:
  a detection means for obtaining display screen data from the video light;
  means for obtaining correction data on the basis of the display screen data;
  means for storing the correction data in the memory;
  means for correcting the video signal on the basis of the correction data stored in said memory; and
  means for inputting the corrected image data to the liquid crystal panel driver circuit.

According to another aspect of the present invention, there is provided a display device comprising a light source, a liquid crystal panel and a screen, for projecting with magnification onto the screen video light obtained by irradiating with light the liquid crystal panel to which a video signal is inputted, characterized in that the display device comprising:
  a detection means for obtaining display screen data from the video light;
  an arithmetic means for obtaining correction data from the display screen data;
  means for storing the correction data in the memory; and
  means for correcting the video signal on the basis of the correction data stored in the memory.

According to still another aspect of the present invention, there is provided a display correction system, characterized by comprising:

means for irradiating with light a display device to which a video signal is inputted, to thereby obtain video light;

a detection means for obtaining display screen data from the video light;

means for obtaining correction data on the basis of the display screen data;

means for storing the correction data in s memory;

means for correcting the video signal on the basis of the correction data to correct the video light; and means for obtaining a display from the corrected video light.

In the above respective structures, the correction data is characterized by being a digital signal.

In the above respective structures, the memory is characterized by being a gamma correction memory.

BRIEF DESCRIPTION OF THE DRAWINGS

In the accompanying drawings:

FIG. 1 is a schematic views showing one embodiment of the present invention;

FIG. 2 is a schematic view showing an optical system and a light source; and

FIG. 3 is a view showing a conventional example.

DETAILED DESCRIPTION OF THE PREFERRED EMBODIMENTS

Modes for carrying out the present invention are shown by Embodiments below.

Hereinafter, embodiments according to the present invention will be described. Needless to say, the present invention is not limited to those embodiments.

Embodiment 1

Shown in FIG. 1 is a schematic view of the present invention. Reference numeral 101 denotes a rear projector type display device that displays on a screen 104 video light from an optical system and a light source 102. A mirror 103 is provided to introduce the video light from the optical engine 102 onto the screen 104. The screen 104 is composed of a light transmission plate mainly made of a transparent material.

The optical system and the light source 102 is, as shown in FIG. 2, mainly comprise source 201, mirrors 204, liquid crystal panels 207, 208 and 209, and cross dichroic mirrors 203 and 206.

In FIG. 2, the light source 201 employs a metal halide lamp. The light source 201 is not particularly limited thereto as long as it is a white lamp. As shown in FIG. 2 as an example, the optical system and the light source 102 are constituted by, the cross dichroic mirror 203 that splits the light from the light source into three rays of light colored distinctively with red, blue or green to emit; the cross dichroic mirror 206 that respectively converges the split rays of light of three colors; the total reflection mirror 204; a polarizer 205; and the three liquid crystal panels 207, 208 and 209. The optical system and the light source 102 are not particularly limited thereto as long as they are rear projection type optical system and light source. Though not shown, an arrangement may be employed as another optical system in which a condenser is provided between the light source and the liquid crystal panel, or may be employed an arrangement in which projection lenses (or, the like) are provided between the liquid crystal panels and the screen 104. In passing, although shown in this embodiment is a rear projector of triple-panel model, it is needless to say that the present invention is not confined to that structure.

The rays of light of three colors emitted from the cross dichroic mirror 203 is irradiated onto liquid crystal panels, respectively, and the obtained images on the liquid crystal panels are synthesized by the cross dichroic mirror 206, so that they are respectively magnified and irradiated onto the screen to obtain an image. In this way, the color display can be gained without providing a color filter.

To the optical system and the light source 102, an HDTV video RGB signal 105 is inputted via an exclusive-to-R gamma correction circuit 106, an exclusive-to-G gamma correction circuit 107 and an exclusive-to-B gamma correction circuit 108. In each gamma correction circuit, a memory (correction memory 109, 110, 111) is provided to connect with a personal computer (an arithmetic processing unit) 112 for rewriting the contents in this memory table. The personal computer 112 is connected to a DMM (digital multi meter) 113.

It should be noted that the above-mentioned gamma correction circuits and memories may be fabricated using a TFT or the like on the same substrate as the active matrix substrate of the liquid crystal panel for the integration.

A description will now be made of the operation of rewriting the contents of the memory table in the correction memory of this embodiment.

First, the video light from the optical system and the light source is directly read by a sensor (not shown) and is converted into a digital signal by the DMM (digital multi meter) 113. Conventionally, an image displayed on the screen is read at the time of shipment. In contrast with that, this embodiment employs an arrangement in which more precise image data as compared with conventional one is read by reading the video light directly, not by way of the optical system (a magnifying lens, mirror, screen, etc.), from the optical path traveling from the optical system and the light source to the screen with the sensor provided at, for example, a lens cover 100 of the optical system and the light source Incidentally, the lens cover defined in this specification is a general term for a base member or a supporting base to which the sensor provided in the optical path traveling from the optical system and the light source to the screen can be attached. As the lens cover, a lid-like plastic member is used in this embodiment. The lid-like plastic member functions as a shield object and is optionally set by a user over the optical system and the light source so that the sensor may sense only the light from the optical system and the light source. As to the lens cover, a base member or a supporting base of any form and material may be used unrestrictively to which the sensor can be attached.

In this embodiment, the lens cover 100 for the optical system and the light source provided with a photo diode is designed to be set by a user for proper correction in accordance with the need of the user. The present invention is, of course, not limited to the use of photo diode, and various known sensors (such as a CCD and an image sensor) can be adapted on condition that they function as means for detecting from the video light the data as an analog signal or a digital signal.

The sensor may be provided unrestrictively at any place along the optical path traveling from the light source to the screen. For instance, when a correction regarding degradation of the light source is intended, such an arrangement may be employed that data of luminous intensity is obtained from the light source by an image sensor provided on the same substrate as a display element substrate of the liquid crystal panel.

It is desirable in this embodiment to read video light information relatively to all the pixels. Alternatively, the video light information on representative pixels may be read. In the former arrangement where the video light information is read relatively to all the pixels, if one pixel is degraded to cause a slight change in the display, the video signal may appropriately be corrected by adjusting the applied voltage.

Incidentally, the basic function of the DMM shown in FIG. 1, in the case of the analog signal obtained by the above detecting means, is of an A/D converter for converting the video light information into a digital signal. Further, the DMM has another function of providing the personal computer (arithmetic processing unit) with a position on the liquid crystal panel (i.e., address). The DMM may be incorporated in the rear projector 101. Though used in this embodiment is the DMM, the invention is not particularly limited thereto and any A/D converter may be employed. For instance, an oscilloscope capable of a high speed reading may be used instead of this DMM. Further, when the data obtained by the above detection means is of a digital signal, the DMM is not necessary.

The obtained video light data of digital signal is arithmetically processed by the personal computer (arithmetic circuit) to obtain data for gamma correction. This gamma correction data is written into a correction memory table within the gamma correction circuit. Although the personal computer is connected in this embodiment, a CPU having an ability to perform the same arithmetic processing may alternatively be incorporated in the display device. Employing such an arrangement, a display device provided with a correction system would be realized with the effect that the device is downsized to be lightweight.

A curved approximation gamma correction circuit is used as the gamma correction circuit in this embodiment. Gamma correction includes gamma correction of liquid crystal, gamma correction by a camera or the like. In the cycle to rewrite the memory table in the correction memory, it is desirable that a user sets the lens cover to conduct correction whenever the device is used.

A preferable arrangement will be such that the lens cover is automatically set when the power supply of the display device is turned off, and the lens cover is automatically removed to begin displaying, after the sensor at the lens cover reads data upon activation of the display device, correction data is rewritten and the video light is corrected. More preferably, correction is carried out by regularly obtaining, while displaying images, data from the video light to rewrite the memory table in the correction memory.

In this embodiment, written into the correction memory table is mainly the data for gamma correction. It is desirable, however, to simultaneously write into the correction memory table the data, not particularly limiting to the gamma correction, but for various correction (luminance correction, visual angle characteristic correction, display defect correction, display correction dependent on preference of a user).

This correction memory is comprised of a lookup table. In the lookup table, the result of arithmetic, i.e., a predetermined function is stored as a correspondent relationship between the independent variable and the dependent variable. The correction memory is not limited to the lookup table.

With the use of thus regularly rewritten correction memory, correction processing (gamma correction, luminance correction, visual angle characteristic correction, display defect correction, display correction dependent on preference of a user) is effected on the inputted video signal 105 to input the corrected signal to the liquid crystal panel, thereby attaining sustainment of good display characteristics.

Embodiment 2

In this embodiment, an example (not shown) where the present invention is applied to a front projector will be disclosed. The front projector irradiates light from a light source onto a liquid crystal panel to form an image on a reflection type screen, providing a user with the reflected light from the screen as an image.

This embodiment adopts an arrangement in which a display device is provided with a detection means, and a video signal is corrected by regularly obtaining, while displaying images, image information from light reflected from the screen to rewrite a correction memory.

A CCD camera or the like is used as the detection means for the image information and is disposed, within the display deice, in parallel with an optical system and a light source. In this arrangement, displayed images are periodically captured by the CCD camera to optionally correct a video signal on the basis of the captured information. With this, display quality can always be kept high.

In the above described embodiments, the order in which the video signal is corrected is of course not particularly restricted but may properly be changed.

Also, the external gamma correction circuit illustrated as the gamma correction circuit in the above embodiments may desirably be replaced by a gamma correction circuit formed with a TFT or the like on the same substrate as the panel, which contributes to a downsized and lightweight device. Preferably, the correction circuit may be fabricated simultaneously with the fabrication of display elements, which leads to reduction in manufacturing cost.

Consequently, according to the present invention, deterioration in the display characteristics (reproducibility of color, brightness) incurred by the degradation in the light source can be reduced. In addition, lowering of display characteristics (contrast ratio) caused by the degradation in the liquid crystal panel (liquid crystal materials, pixel TFTs, polarizer, etc.) can be reduced. Thus, achievement is made to keep display having good in gamma characteristic and high in image quality and fineness for hours.

What claimed is:

1. A display device comprising:
    a liquid crystal panel;
    a screen;
    a liquid crystal panel driver circuit; and
    a memory,
    wherein said display device displays video light obtained by irradiating with light said liquid crystal panel to which a video signal is inputted, and
    wherein said display device further comprises:
        an optical system provided between said liquid crystal panel and said screen;
        a detection means for obtaining display screen data from the video light, said detection means provided between said liquid crystal panel and said optical system;
        means for obtaining correction data on the basis of the display screen data;
        means for storing the correction data in a memory;
        means for correcting the video signal on the basis of the correction data stored in said memory; and
        means for inputting the corrected image data to said liquid crystal panel driver circuit.

2. A display device comprising:
    a light source;
    a liquid crystal panel; and
    a screen, wherein the display device projects with magnification onto said screen video light obtained by irradiating with light said liquid crystal panel to which a video signal is inputted, and wherein said display device further comprises:
an optical system provided between said liquid crystal panel and said screen;
a detection means for obtaining display screen data from the video light, said detection means provided between said liquid crystal panel and said optical system;
an arithmetic means for obtaining correction data from the display screen data;
means for storing the correction data in a memory; and
means for correcting the video signal on the basis of the correction data stored in said memory.

3. A display correction system comprising:
means for irradiating with light a display device to which a video signal is inputted, to thereby obtain video light;
a detection means for obtaining display screen data from the video light;
means for obtaining correction data on the basis of the display screen data;
means for storing the correction data in a memory;
means for correcting the video signal on the basis of the correction data to correct the video light; and
means for obtaining a display on a screen from the corrected video light,
wherein said display device comprises an optical system between said display device and said screen and,
wherein said detection means is provided between said display device and said optical system.

4. A display device according to claim 1 wherein the correction data is a digital signal.

5. A display device according to claim 2 wherein the correction data is a digital signal.

6. A display system according to claim 3 wherein the correction data is a digital signal.

7. A display device according to claim 1 wherein said memory is a gamma correction memory.

8. A display device according to claim 2 wherein said memory is a gamma correction memory.

9. A display system according to claim 3 wherein said memory is a gamma correction memory.

10. A display device comprising:
a screen;
a liquid crystal panel for displaying a video light on said screen;
an optical system provided between said screen and said liquid crystal panel;
a sensor for obtaining display data from the video light, the sensor provided between the liquid crystal panel and the optical system to sense the video light between the liquid crystal panel and the optical system;
a digital multi meter for obtaining correction data on the basis of the display data;
a computer connected with the digital multi meter;
a memory connected with the computer for storing the correction data in the memory; and
a correction circuit for correcting a video signal on the basis of the correction data to correct the video light.

11. A display device comprising:
a screen;
a liquid crystal panel for displaying a video light on said screen;
an optical system provided between said screen and said liquid crystal panel;
a sensor for obtaining display data from the video light, the sensor provided between the liquid crystal panel and the optical system to sense the video light between the liquid crystal panel and the optical system;
a digital multi meter for obtaining correction data on the basis of the display data;
a CPU connected with the digital multi meter;
a memory connected with the CPU for storing the correction data in the memory; and
a correction circuit for correcting a video signal on the basis of the correction data to correct the video light.

12. A device according to claim 10 wherein said sensor comprises at least one selected from the group consisting of a photo diode, a CCD and an image sensor.

13. A device according to claim 11 wherein said sensor comprises at least one selected from the group consisting of a photo diode, a CCD and an image sensor.

14. A device according to claim 1 wherein said detection means comprises at least one selected from the group consisting of a photo diode, a CCD and an image sensor.

15. A device according to claim 2 wherein said detection means comprises at least one selected from the group consisting of a photo diode, a CCD and an image sensor.

16. A device according to claim 3 wherein said detection means comprises at least one selected from the group consisting of a photo diode, a CCD and an image sensor.

17. A display device comprising:
a screen;
a liquid crystal panel for displaying a video light on said screen;
an optical system provided between said screen and said liquid crystal panel;
a sensor for obtaining display data from the video light, the sensor provided between the liquid crystal panel and the optical system to sense the video light between the liquid crystal panel and the optical system;
an A/D converter for obtaining correction data on the basis of the display data;
a computer connected with the A/D converter;
a memory connected with the computer for storing the correction data in the memory; and
a correction circuit for correcting a video signal on the basis of the correction data to correct the video light.

18. A display device comprising:
a screen;
a liquid crystal panel for displaying a video light on said screen;
an optical system provided between said screen and said liquid crystal panel;
a sensor for obtaining display data from the video light, the sensor provided between the liquid crystal panel and the optical system to sense the video light between the liquid crystal panel and the optical system;
an A/D converter for obtaining correction data on the basis of the display data;
a CPU connected with the A/D converter;
a memory connected with the CPU for storing the correction data in the memory; and
a correction circuit for correcting a video signal on the basis of the correction data to correct the video light.

19. A display device according to claim 1 wherein said optical system comprises at least one selected from the group consisting of a lens, a mirror and a screen.

20. A display device according to claim 2 wherein said optical system comprises at least one selected from the group consisting of a lens, a mirror and a screen.

21. A display device according to claim 3 wherein said optical system comprises at least one selected from the group consisting of a lens, a mirror and a screen.

22. A display device according to claim 10 wherein said optical system comprises at least one selected from the group consisting of a lens, a mirror and a screen.

23. A display device according to claim 11 wherein said optical system comprises at least one selected from the group consisting of a lens, a mirror and a screen.

24. A display device according to claim 17 wherein said optical system comprises at least one selected from the group consisting of a lens, a mirror and a screen.

25. A display device according to claim 18 wherein said optical system comprises at least one selected from the group consisting of a lens, a mirror and a screen.

26. A display device according to claim 10 wherein said memory is a gamma correction memory.

27. A display device according to claim 11 wherein said memory is a gamma correction memory.

28. A display device according to claim 17 wherein said memory is a gamma correction memory.

29. A display device according to claim 18 wherein said memory is a gamma correction memory.

* * * * *